(12) United States Patent
Ingersoll et al.

(10) Patent No.: US 8,683,321 B2
(45) Date of Patent: *Mar. 25, 2014

(54) REGISTRY DRIVEN INTEROPERABILITY AND EXCHANGE OF DOCUMENTS

(75) Inventors: Christopher Todd Ingersoll, Berkeley, CA (US); Jayaram Rajan Kasi, San Jose, CA (US); Alexander Holmes, San Jose, CA (US); Michael Clark, Los Gatos, CA (US); Ashok Aletty, Saratoga, CA (US); Sathish Babu K. Senathi, Fremont, CA (US); Helen S. Yuen, Oakland, CA (US)

(73) Assignee: Open Invention Network, Durham, NC (US)

(*) Notice: Subject to any disclaimer, the term of this patent is extended or adjusted under 35 U.S.C. 154(b) by 777 days.

This patent is subject to a terminal disclaimer.

(21) Appl. No.: 12/763,136

(22) Filed: Apr. 19, 2010

(65) Prior Publication Data
US 2010/0205522 A1    Aug. 12, 2010

Related U.S. Application Data

(60) Continuation of application No. 11/369,784, filed on Mar. 7, 2006, now Pat. No. 7,703,008, which is a division of application No. 10/199,963, filed on Jul. 19, 2002, now Pat. No. 7,047,488.

(51) Int. Cl.
*G06F 17/00* (2006.01)

(52) U.S. Cl.
USPC ............ 715/234; 715/229; 715/236; 715/239

(58) Field of Classification Search
USPC ................................. 715/229, 234, 236, 239
See application file for complete search history.

(56) References Cited

U.S. PATENT DOCUMENTS

| | | | |
|---|---|---|---|
| 5,005,200 A | 4/1991 | Fischer |
| 5,157,726 A | 10/1992 | Merkle et al. |
| 5,159,630 A | 10/1992 | Tseng et al. |
| 5,224,166 A | 6/1993 | Hartman, Jr. |
| 5,311,438 A | 5/1994 | Sellers et al. |
| 5,513,323 A | 4/1996 | Williams et al. |

(Continued)

FOREIGN PATENT DOCUMENTS

| | | |
|---|---|---|
| JP | 05-127961 A | 5/1993 |
| JP | 09-179760 A | 7/1997 |
| JP | 11-143753 A | 5/1999 |
| WO | 01/33369 A1 | 5/2001 |

OTHER PUBLICATIONS

Australian Examiner's Report on patent application No. 2003251886 dated Sep. 26, 2008, 2pp.

(Continued)

*Primary Examiner* — Stephen Hong
*Assistant Examiner* — Matthew Ludwig
(74) *Attorney, Agent, or Firm* — Haynes Beffel & Wolfeld LLP; Ernest J. Beffel, Jr.

(57) ABSTRACT

The present invention relates to systems and methods for registry driven transformation of a document exchanged between businesses or applications. More particularly, it relates to systems and protocols for using one or more commonly accessible registries to transform electronic commerce documents among dissimilar interfaces, preferably XML documents. Particular aspects of the present invention are described in the claims, specification and drawings.

20 Claims, 11 Drawing Sheets

(56) References Cited

U.S. PATENT DOCUMENTS

| | | | |
|---|---|---|---|
| 5,557,798 | A | 9/1996 | Skeen et al. |
| 5,784,566 | A | 7/1998 | Viavant et al. |
| 5,790,677 | A | 8/1998 | Fox et al. |
| 5,812,669 | A | 9/1998 | Jenkins et al. |
| 5,941,945 | A | 8/1999 | Aditham et al. |
| 6,049,785 | A | 4/2000 | Gifford |
| 6,072,942 | A | 6/2000 | Stockwell et al. |
| 6,115,744 | A | 9/2000 | Robins et al. |
| 6,125,391 | A | 9/2000 | Meltzer et al. |
| 6,148,290 | A | 11/2000 | Dan et al. |
| 6,269,380 | B1 | 7/2001 | Terry et al. |
| 6,389,533 | B1 | 5/2002 | Davis et al. |
| 6,393,442 | B1 | 5/2002 | Cromarty et al. |
| 6,425,119 | B1 | 7/2002 | Jones et al. |
| 6,434,628 | B1 | 8/2002 | Bowman-Amuah |
| 6,463,460 | B1 | 10/2002 | Simonoff |
| 6,507,875 | B1 * | 1/2003 | Mellen-Garnett et al. .... 719/310 |
| 6,538,673 | B1 | 3/2003 | Maslov |
| 6,636,889 | B1 | 10/2003 | Estrada et al. |
| 6,671,695 | B2 | 12/2003 | McFadden |
| 6,789,077 | B1 | 9/2004 | Slaughter et al. |
| 6,862,573 | B2 * | 3/2005 | Kendall et al. ............... 705/7.11 |
| 6,868,401 | B1 | 3/2005 | Carpenter et al. |
| 6,961,760 | B2 | 11/2005 | Li et al. |
| 7,219,223 | B1 | 5/2007 | Bacchus et al. |
| 7,458,018 | B2 | 11/2008 | Jones et al. |
| 2002/0194181 | A1 | 12/2002 | Wachtel |
| 2002/0194227 | A1 | 12/2002 | Day et al. |
| 2003/0046583 | A1 | 3/2003 | Goldman et al. |
| 2003/0079029 | A1 | 4/2003 | Garimella et al. |
| 2003/0208505 | A1 | 11/2003 | Mullins et al. |
| 2004/0205615 | A1 * | 10/2004 | Birder ............................ 715/523 |
| 2005/0071266 | A1 | 3/2005 | Eder |

OTHER PUBLICATIONS

Pivotal Intelligence Engine, Technology Overview, 2001 Pivotal Corporation, pp. 1-27.

XEDI.org, XML and EDI: Peaceful Co-Existence, by XMLSocutions Corporation, Ó 1999-2001 XMLSolutions, 12pp.

B. Omelayenko, D. Fensel, "Scalable Document Integration for B2B Electronic Commerce", Special Issue of Electronic Commerce Research Journal onn B2B Research, Sep. 12, 2001, pp. 1-31.

Burdett, David, et al. "Collaboration-Protocol Profile and Agreement Specification—Version 1.0", ebXML Trading Partners Team. May 20, 2001, 90 pp, www.ebxml.org/specs/ebCCP.pdf.

Supplementary European Search Report for European Patent Application No. 03765553.7, PCT/US03/21862, dated Dec. 19, 2008, mailed Jan. 12, 2009 2pp.

White Paper, "Plug and Play Business Software Integration the Compelling Value of the Open Applications Group" Open Applications Group, Copyright 2000, pp. 1-15.

Open Applications Group White Paper Document No. 20010301, Best Practices and XML Content for eBusiness and Applicaiton Integration, OAGIS Extensions Release 1.1, 2001, pp. 1-34.

Glushko article: Advanced Technology Program Close Out Performance Report: Project Title: Component-Based Commerce: The Interoperable Future, Apr. 14, 2000, 8 pages, Publication Status Unclear.

Glushko article: ATP Close Out Performance Report: Component-Based Commerce: The Interoperable Future, 9th Revision, modified Jan. 31, 2000, 57 pages, Publication Status Unclear.

Jones, Information Security article, Jan. 2002, Authorization / EAM Ain't Easy, http://www.infosecuritymag.com/2002jan/features_eam.shtml, 12 pages.

Salz, R., O'Reilly, XML.Com: Examining WSDL, May 15, 2002, available at http://www.xml.com/pub/1/2002/05/15/ends.html, 5 pgs.

Schneier, Bruce, Applied Cryptography 1966, John Wiley and Sons, Inc., pp. 40-41.

VORDEL Web Services Security: Knowledgebase, http://www.vordel.com/knowledgebase/vordel_view1.html, printed Sep. 11, 2002, 2 pages.

WebServices Framework & Assertion Exchange Using SAML, 5 pages, http://www.w3.org/2001/03/WSWS-popa/paper23/, printed Sep. 11, 2002.

Cover Pages: Web Service Description Langue (WSDL), Technology Reports, 31 pages, Jul. 9, 2002, located at http://xml.coverpages.org/wsdl.html.

K. Narayanaswamy, K.V. Bapa Rao, "An Incremental Mechanism for Schema Evolution in Engineering Domains", IEEE 1988, pp. 294-300.

Jul. 30, 2012 OA from JP 2010-150940, 2-page translation.

* cited by examiner

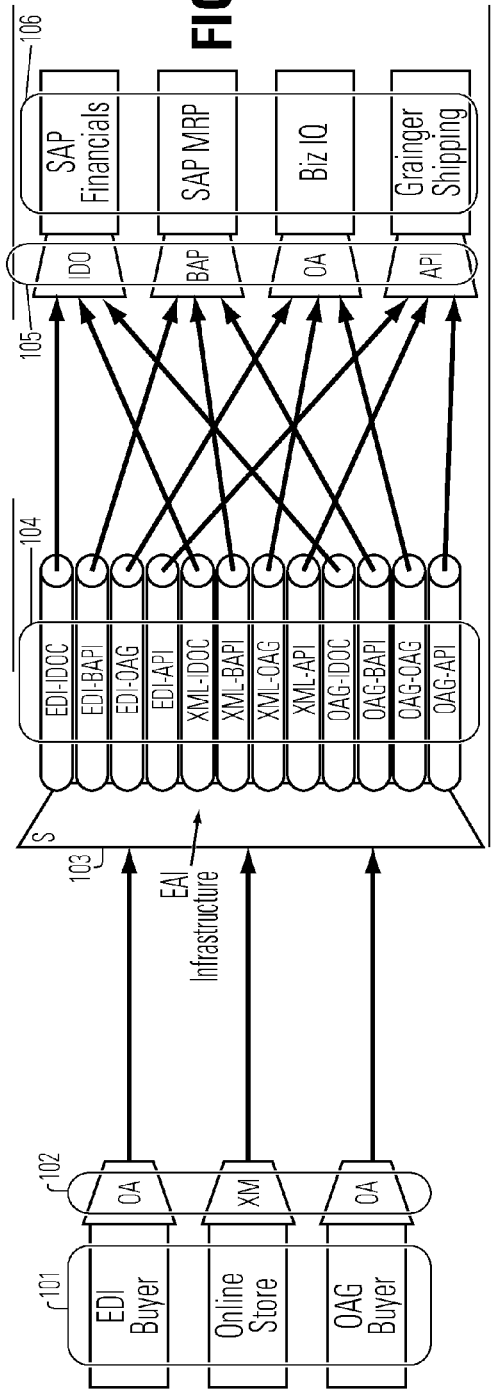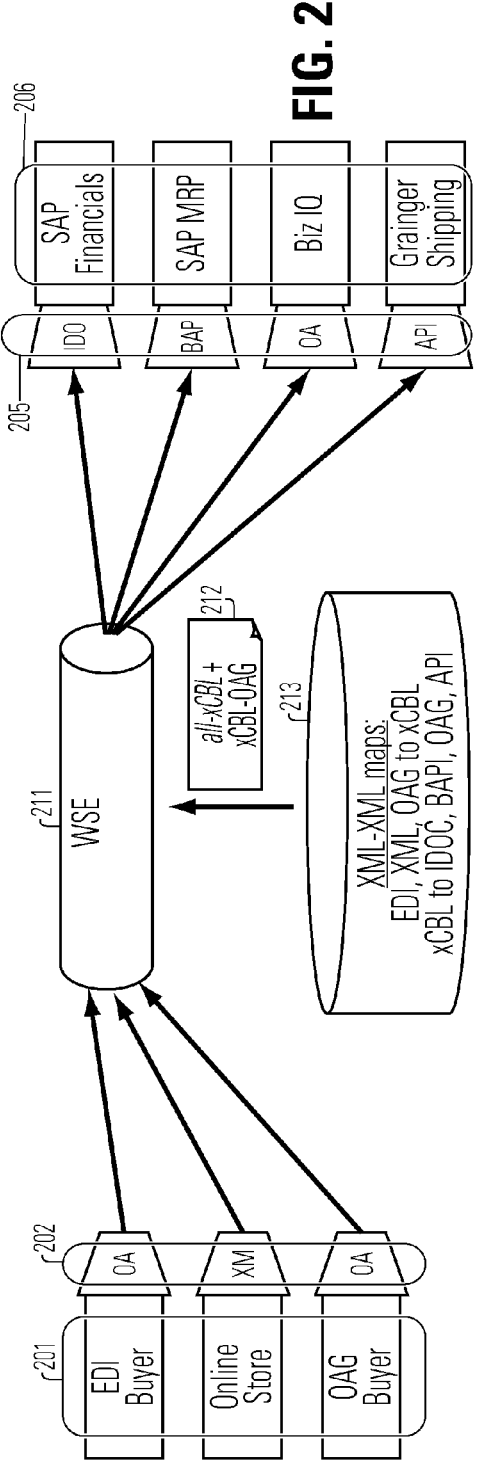

FIG. 6

| From DocType | To | Send TP | Receive TP | Send Service | Send Action | Receive Service | Receive Action | Location | Cost | Component IDs |
|---|---|---|---|---|---|---|---|---|---|---|
| PurchaseOrder, CBL, SOX, Y, 200 | PurchaseOrder, CBL, SOX, A, 300 | * | * | * | * | * | * |  | 50 | T1 |
| PurchaseOrder, CBL, SOX, X, 200 | PurchaseOrder, CBL, SOX, X, 300 | TP1 | * | * | * | * | * |  | 10 | T2 |
| PurchaseOrder, CBL, SOX, Y, 200 | PurchaseOrder, CBL, SOX, Y, 300 | * | TP2 | * | * | * | * | * | 10 | T1, T2 |

FIG. 7

| Component ID | Type | Implementation | Configuration | Package | Version |
|---|---|---|---|---|---|
| T1 | Java | PoConversion.class | Threading=safe;... | http://tx.com/t1.jar | 1.0 |
| T2 | XST | http://tx.com/xst/PoConversion | Threading=safe;... | http://tx.com/xst | 1.0 |
| T2 | XST | http://tx.com/xst/PoConversion | Threading=safe;... | http://tx.com/xst | 2.0 |

FIG. 15

REGISTRY DRIVEN INTEROPERABILITY AND EXCHANGE OF DOCUMENTS

PRIORITY INFORMATION

This application is a continuation of U.S. application Ser. No. 11/369,784 filed 7 Mar. 2006, which is a divisional of U.S. application Ser. No. 10/199,963, entitled "Registry Driven Interoperability and Exchange of Document" by Christopher Todd Ingersoll, Jayaram Rajan Kasi, Alexander Holmes, Michael Clark, Ashok Aletty, Sathish Babu K. Senathi and Helen S. Yeun filed on 19 Jul. 2002.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to systems and methods for registry driven semantic transformation of a document exchanged between businesses or applications. More particularly, it relates to systems and protocols for using one or more commonly accessible registries to transform electronic commerce documents among dissimilar interfaces, preferably XML documents.

Business-to-business (B2B) and application-to-application (A2A) electronic commerce are replacing former protocols for electronic data interchange (EDI). As businesses strive to improve their efficiency with B2B and A2A systems, a number of incompatible platforms and competing standards have emerged. One need that has been identified is to convert the documents from one system to another.

XML has become a widely used type of data because the rigid syntactic rules which must be applied to create inline markup make it relatively simple for computer programs to interpret and process. For example, a purchase order written in XML could be processed by an order entry software application that knows how to read the markup annotations that describe what is being purchased, who the purchaser is, and so forth. The growing acceptance of XML as an encoding scheme for documents has led to development of XML-ified application program interfaces for many legacy applications by enterprise adapter implementation (EAI) vendors.

EAI vendors bridge one system to the next, on an application-by-application basis. Interoperability is achieved by design, at design time. Connections between systems or applications are static. Implementation of new versions of applications requires modification of the static connections. Routing among applications is typically within an enterprise. Integration logic is developed on a point-to-point basis. Semantic logic is coded into EAI routines. Semantic logic and syntactic logic are mixed in the coding. The sending party or source of a document is responsible to ensure that what they send is exactly what the target or recipient has advertised to receive. There is no concept of modeling degrees of compatibility for an interface, as opposed to requiring perfect compatibility. This perfect compatibility is difficult to achieve, as it requires that all clients be updated with the latest versions of the services' interfaces and that interfaces be updated contemporaneously. Transformation components are difficult to reuse. No commonly accessible repository is provided to capture individual transformation preferences or to support transformation based on user profiles. The EAI vendor approach makes it difficult and costly to adapt transform routines from one pair of systems or applications to another.

FIG. 1 illustrates the EAI vendor approach, as applied to supplier processing of incoming purchase orders into four disparate systems. In this figure, incoming purchase orders originate from three sources 101, an electronic data interchange (EDI) buyer, and online store customer and an Open Application Group Business Object Document (OAG BOD)-compliant buyer. Each of the sources has a native interface 102 that produces a purchase order as input to the EAI infrastructure 103. The formats of the documents may include EDI, XML and OAG. Four target systems 106, include an SAP Financial system, an SAP MRP system, Biz IQ system and a Granger shipping system. The native formats of documents 105 accepted by these target systems include IDOC, BAPI, OAG and a custom application program interface (API). To connect the source and target, both syntactic and semantic differences need to be overcome. Point-to-point adapters 104 transform source documents into target documents on a pairwise basis. Even document transformations between systems utilizing the same syntax, such as OAG-to-OAG transformations, involved differing semantics, so an adapter is required. When a source or target system is updated, for instance if Oracle financials are substituted for SAP financials or an upgraded shipping system is installed, new adapters need to be written. In all likelihood, old and new adapters are both retained by the EAI infrastructure. As systems are updated, more and more adapters are subject to revision or replacement. A single transformation engine manages the transformation process and provides the transformation resources.

Accordingly, opportunities arise to devise methods and structures that commonly manage transformation of documents between dissimilar interfaces, that provide runtime interoperability and distributed execution of transformations.

SUMMARY OF THE INVENTION

The present invention relates to systems and methods for registry driven transformation of a document exchanged between businesses or applications. More particularly, it relates to systems and protocols for using one or more commonly accessible registries to transform electronic commerce documents among dissimilar interfaces, preferably XML documents. Particular aspects of the present invention are described in the claims, specification and drawings.

BRIEF DESCRIPTION OF THE DRAWINGS

FIG. 1 is a high-level block diagram of a prior art transformation process using point-to-point connections.

FIG. 2 is a high-level block diagram of the transformation process using a web services engine.

FIGS. 6 and 7 are tables for transform sequences and logic components used to carry out transform sequences.

FIGS. 14 and 15 illustrate user interfaces that support administration of document families and searching to find transforms.

DETAILED DESCRIPTION

Figure 3:
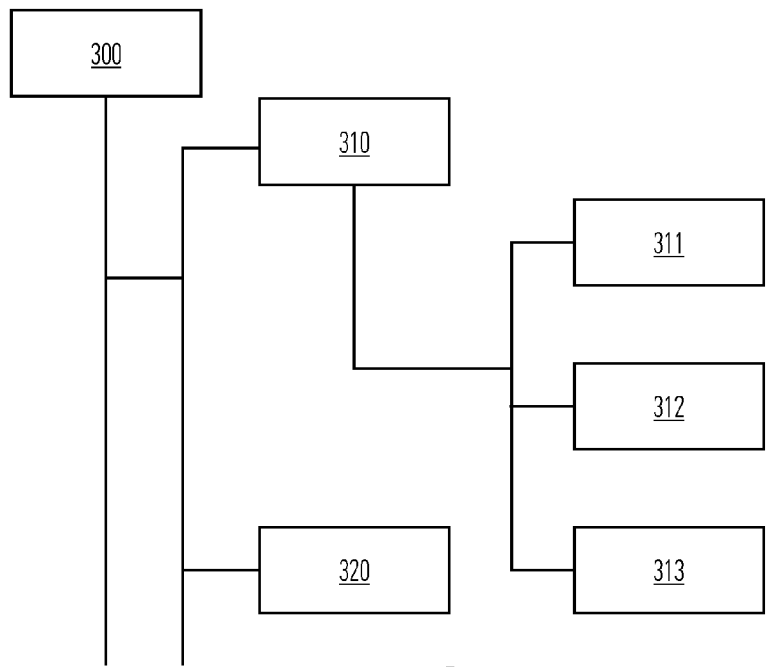
FIG. 3 is a hierarchical block diagram of document families and versions.

The following detailed description is made with reference to the figures. Preferred embodiments are described to illustrate the present invention, not to limit its scope, which is defined by the claims. Those of ordinary skill in the art will recognize a variety of equivalent variations on the description that follows.

FIG. 2 depicts supplier processing of incoming purchase orders destined for four disparate systems. Incoming purchase orders originate from three sources 201, an EDI buyer, an online store customer and an OAG-compliant buyer. The native formats utilized by the three sources 201 may include EDI, XML and OAG. Four target systems 206 include an SAP Financial system, an SAP MRP system, a Biz IQ system and a Grainger shipping system. The native formats accepted by these target systems 206 include IDOC, BAPI, OAG and a custom API. In this system, a web services engine 211 performs semantic transformations using a common syntactic base. For instance, EDI and OAG documents are converted to XML, as a common syntactic base. Transformations from XML to XML handle semantic differences between the source and target document. XML documents may be reconverted to native formats such as EDI, OAG, IDOC, or BAPI. The syntactical transformations to and from XML may be handled as part of the web services engine 211 or by the interfaces or adapters 202, 205 associated with the source 201 and target 206.

The web services engine 211 has access to a variety of transforms 213, including transforms using the common syntactic base. These transforms may be reusable. More than one transform may be invoked to convert a document from source semantics to target semantics. It may be desirable to utilize a common semantic base for transformations, for instance, transforming incoming documents to a well-understood document schema, such as the xCBL schema for electronic commerce documents 212. By transforming incoming documents to a common semantic base, the need for point-to-point transforms is minimized. The transforms may be chained and may be reusable. The transforms may be isomorphic or homomorphic. That is, the transforms need not be perfectly reversible. The transforms typically will be rated, either a priori or by comparing source and target semantics before and after transformation, to estimate the degree of loss resulting from the transform. A transform success score can be used to select among alternate sequences of transforms from source to target semantics. Loss resulting from transforms can be compensated for by including in the target document one or more fields that capture imperfectly translated information from the source document. These fields may be user viewable, so that a user associated with the source, the target or an intermediary service provider can respond to imperfections in the computer-implemented transformation service. Alternatively, the source document and target document can be sent to the target, with references to parts of the source document that have been imperfectly transformed or that are suspected of having been imperfectly transformed. These references can be part of the target document or a separate document, such as an error document. They can be a string, a pointer or some other form of reference. References can be provided to one or more sections of the target document where the imperfectly transformed information belongs. The references to the target document may be to an element or subsection of the target document or to a specific location within an element or subsection. In yet another embodiment, the target document and excerpts of the source document can be sent to the target, with references to the excerpts of the source document and, optionally, to the target document.

A commonly accessible registry, partially illustrated in FIG. 2, facilitates management of the community using XML schema definition (XSD)-based XML electronic commerce documents or, more generally, a schema for a syntax using character data encoding text characters and markup data identifying sets of storage units according to the logical structure of the documents. Maintaining transformations in at least one repository facilitates reuse, both in design of needed transforms and execution. A commonly accessible repository of transforms also permits distributed execution. The web services engine may use resources of the source, target, or an intermediary service. Upon determining the interfaces used by source and target, appropriate transform logic can be obtained from the commonly accessible registry or a cache in which transform logic previously obtained from the commonly accessible registry is kept. Interoperability is established at runtime, based on entries in one or more registries and logic residing in one or more repositories. At runtime, connections are dynamically determined between source and target. When source or target implements a version change, the dynamic determination of the connection accounts for the version change.

A commonly accessible registry can provide a so-called semantic hub. The commonly accessible registry may maintain service descriptions for the applications that provide services, such as electronic commerce services. Inbound and outbound document interfaces are registered as part of the service descriptions, preferably in the form of XSD definitions. A service is free to register multiple interfaces, for instance to support multiple versions of an electronic commerce document standard (e.g., xCBL 2.0, xCBL 3.0, or xCBL 3.5) or to support multiple document standards (e.g., xCBL, IDOC, OAG, or BAPI). The introduction of document family concepts provides a way to manage schemas and document types across documents standards and standards versions, as well as custom systems. Document families associate document types that represent the same business events into families. Transformation maps or transforms manage standard and custom logic to convert among document family members. A cost of using a particular transform may reflect imperfect translation of the document. Again, a transform success score can be associated with the transform either a priori, based on prior experience, or by dynamically comparing the semantic content of the document before and after application of the transform.

Maintaining transforms using XML as a common syntactic base is preferred, but not necessary. XML is a rich, self-describing data representation that facilitates declarative mapping logic. Several semantic bases, such as xCBL component model, provide a consistent semantic base to harness XML's powerful semantics. Modeling of XML documents to a semantic registry facilitates reuse and rapid development of new transforms, thereby enhancing the value of existing transforms. Focusing on semantic mapping, with a common syntactic base and even a common semantic base, reduces the complexity of developing new transforms. Business analysts, instead of programmers, may be able to use transform-authoring tools to define XML-to-XML semantic conversions.

A document family, as illustrated in FIG. 3, allows for categorization and grouping of documents. Related documents are grouped under the same document family 300. Documents may be specified by a document identifier. The document identifier logical construct is used to represent a root element of a message, for instance a root element of an XML electronic commerce document. A document identifier may specify a document ID, its relationships, versions and family associations. Both XML and non-XML documents may be assigned document identifiers and stored in a common registry. Attributes of the document identifier may include a document identifier (e.g., the name "Order"); the namespace (e.g., urn:x-commerceone:document:com:commerceone:XCBL30:XCBL30.sox); a document library name (e.g., a xCBL, DTD, EDIFACT); a schema language (e.g., SOX, XSDL); a version (e.g., 3.0); and the document family name (e.g., PurchaseOrderFamily, PriceInquiryFamily, QuoteFamily). The document family organizes documents by document identifier in a hierarchy of versions. In FIG. 3, the document family tree 300 or other data structure is used to organize individual families 310, 320. A purchase order family 310, for instance, may include one or more major versions 311, 312, 313. One or more of the major versions may be associated with minor versions (not illustrated), in a similar tree-structure. A version attribute may record both major and minor versioning. One possible differentiation between major and minor visions would be that major versions have significant changes that require transformation, whereas minor versions have no structural differences, only sub-element extensions. Users of the system may commonly extend a document's sub-element without modifying the doctype itself. This sub-element extension can be treated as a minor version, in the same way that modification of the doctype is handled. Therefore, the doctype node represents the doctype schema and all the schemas that make up the doctype element. For example, if the LineItem element is extended, and this extended type is used in instance of the PurchaseOrder, then the PurchaseOrder doctype is versioned. When sub-elements are versioned, users register new doctypes. They specify the parent doctype node and assign a new minor version relationship to the parent. A version ID is generated and assigned to the new node.

Figure 4:
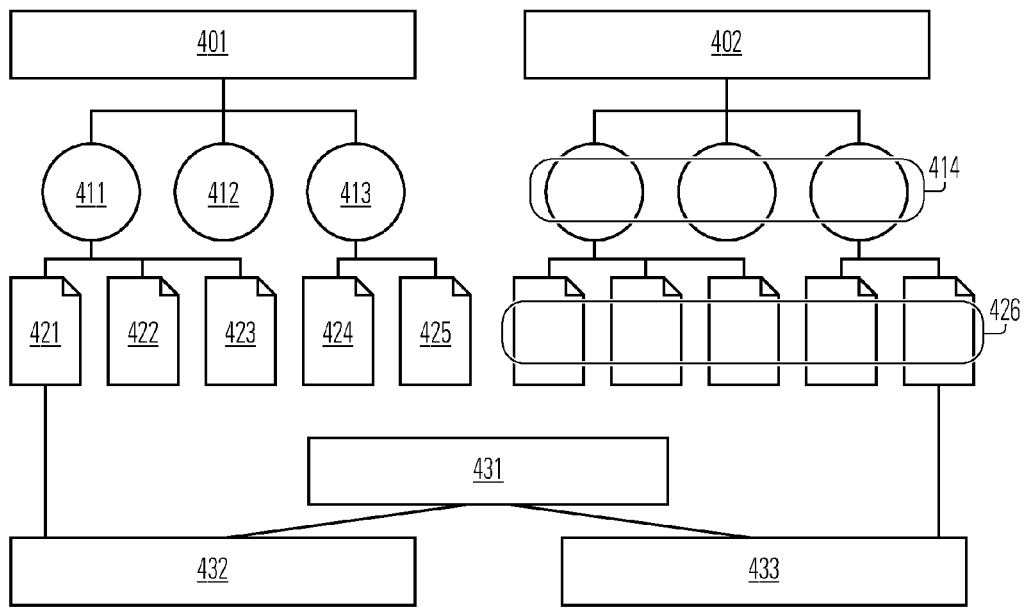
FIG. 4 is a block diagram of document libraries, namespaces, schemas and document families.

A registry may subdivide schemas into namespaces, as illustrated in FIG. 4. XML namespaces (e.g., XSD, SOX, RosettaNet, CIDX) and non-XML namespaces (e.g. EDI, EDIFACT) can be registered and managed using a schema namespace management component. A schema namespace may have various attributes including: a namespace URI; name; classification, namespace status; validation status (for XSD namespaces); namespace version; description; document library name; schema language (for XSD type namespaces); schema files; bean jar file name; dependent namespaces (if any, for XSD and SOX type namespaces); and external or informational URLs. Typically, different versions of namespaces will have different URIs. For instance, document libraries for major xCBL version 3.0 401 and for major xCBL version 3.5 402 may have one or more namespaces (411, 412, 413) and 414, respectively, that can be used to support minor versions. One way of maintaining a schema is to use n files for n document schemas. A namespace manager may store meta data about the namespace, the schema files associated with the namespace and the Java jar file containing JavaBeans and classes corresponding to the schema files. A graphical user interface using a browser-based tool may be used to manage registration, activation, deactivation and deletion of namespace sets. Published namespaces may be first validated, including associated schema files, with tools such as the validation API from XML tools (XDK). In FIG. 4, there are two document libraries 401, 402. Each of the document libraries includes three schema namespaces (411, 412, 413) and 414, respectively. Name spaces are associated with schema files 421-425 and 426. Working back up the tree from a namespace family 431 for purchase orders, for instance, two purchase orders of xCBL 3.0 and xCBL 3.5 types, 432, 433, respectively, are associated with particular document schemas 421, 426, respectively.

Figure 5:
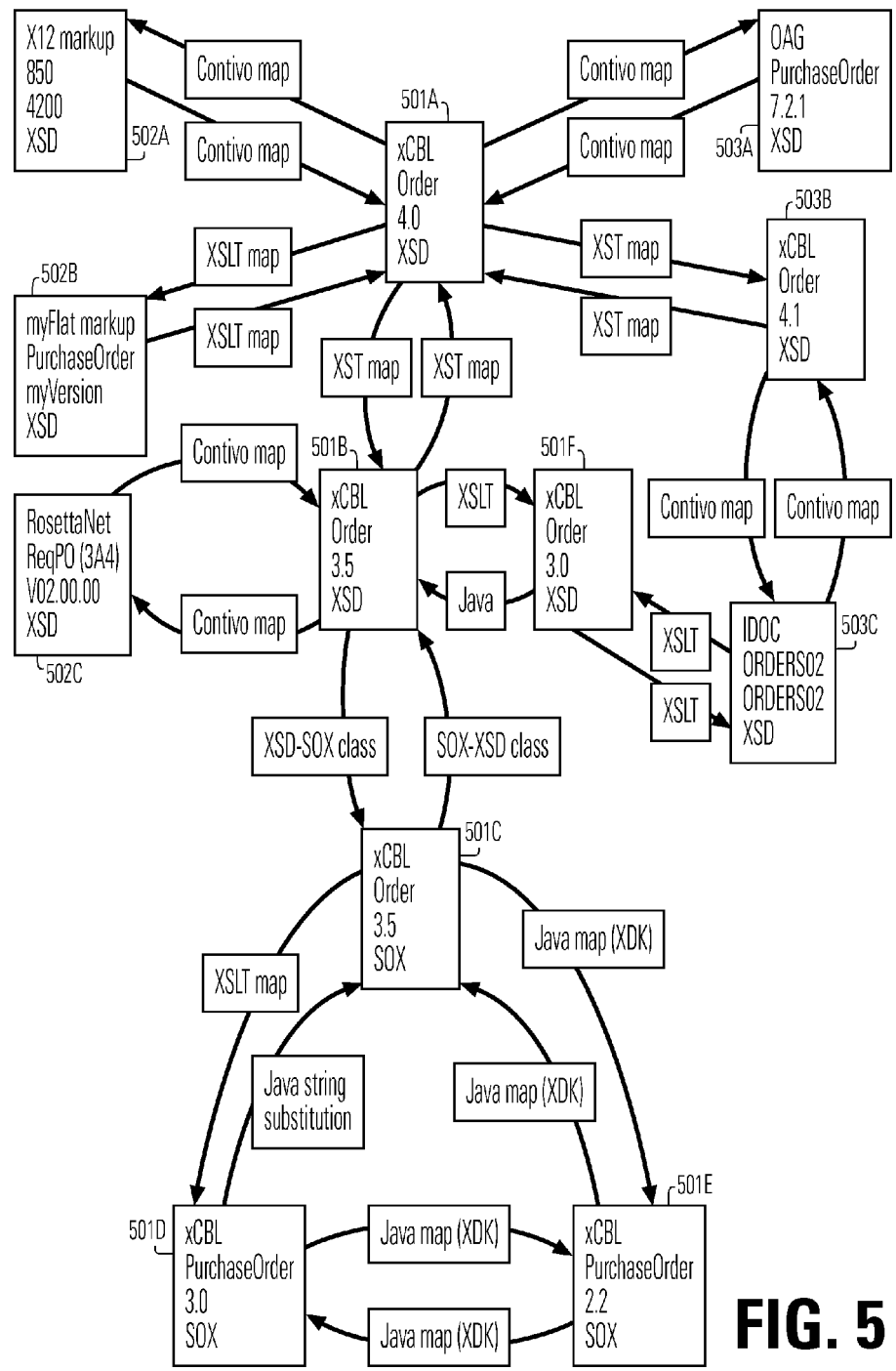
FIG. 5 is a network diagram of document family members and transforms among members.

FIG. 5 presents another view of the document family, depicted here as a network of document family members interconnected by transforms. In this purchase order family, documents 501, 502, 503 are identified by library, document identifier, version and schema type. For instance, document 501A is from the xCBL library, identified as an Order, version 4.0, using the schema type XSD. Document 501C is also from the xCBL library, identified as an Order, version 3.5, using schema type SOX. Document 502A is from the X12 markup library, identified as an 850 document, version 4200, using schema type XSD. Document 502B is custom flat file document marked up in XML. This is the kind of document that could be prepared with a template and word processor, for instance. In this figure, separate transforms identified for each direction of conversion between document family members. Transform types identified included Contivo maps, XST maps, XSLT maps, Java classes translating between XSD and SOX, Java substring substitutions and Java maps (XDK). Different transform types may be used for transforms and inverse transforms between document family members. The system can be adapted to new or different transform types, for instance, as extensions of existing classes. For instance, translating from xCBL version 3.5 501B to xCBL version 3.0 501F involves applying an XSLT transform. Translating the opposite direction involves applying a Java component. The network of document family members interconnected by transforms can be considered a directed graph, in the sense that interconnections between nodes (document family members) are directed links (one directional transforms) having different attributes. Well-known algorithms can be applied to traverse this network while avoiding loops or circular references. Not illustrated in this diagram, an a priori transform success score or an experience-based transform success score can be associated with each of the transforms that link document family members.

FIGS. 6 and 7 depict tables that may be used to identify transforms in a document family such as depicted in FIG. 5. These tables can be accessed at runtime by a transformation engine to identify a preferred transform. Some transforms may be cached. In FIG. 6, the transformation from one document family member 601 to another 602 is accomplished by applying one or more logic components 611 in the order listed. These logic components can be Java class files, XSLT maps, XST maps, or any other generic or custom transform, accommodating current and future document standards and transformation standards. The transform success score 610 measures the imperfection resulting from translating the source 601 to the target document 602. In this example, the transform entries are indexed by the source and target document attributes. These attribute sets comprise the document family namespace, family name, protocol, schema language, doctype, XML QName, and version ID. When searching for transform entries, wildcards can be used in the search. Transform entries may optionally contain flags for special rules 603-608. Custom transformations can be applied at the trading partner level, service level or action level. The source or target trading partner ID can be flagged 603, 604 to indicate that the special logic components should be used for particular source or target trading partner. Similarly, service and action can be flagged 605-608 to indicate that special logic components should be used for particular source or target service or action. The transformation engine should use the most specific transform definition available. For instance, a definition that is specific to a trading partner, service and action triplet would be considered more specific to transform designated only by trading partner. Hierarchical importance may be assigned to trading partner, service or action, in case different elements of the triplet are defined for different transforms. For instance, trading partner may be considered more important than service if two transforms match the source and target document types, one transform which is specific to a trading partner and the other which is specific to a service. Other attributes of the transformation may evoke special rules. The present invention is not limited to special rules categorized by trading partners, services and actions. FIG. 7 provides additional information regarding logic components 701 used as components of transforms in a column 611. For logic components 710, a type 702, an implementation 703, a configuration 704, a package 705 and a version 706 may be supplied.

Figure 8:
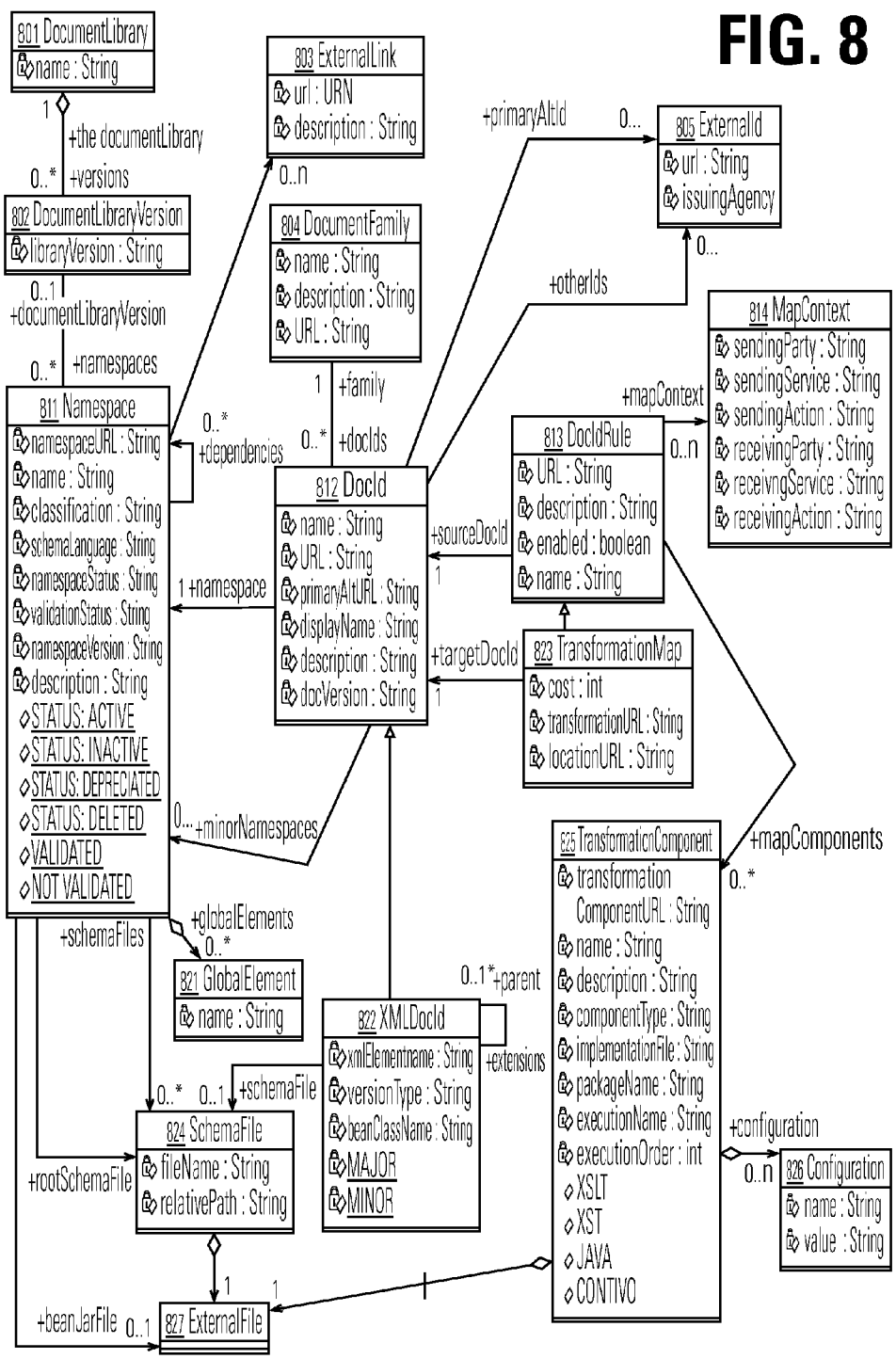
FIG. 8 is a class diagram including document libraries, namespaces, document types and schemas, document families and transforms.

FIG. 8 depicts classes that may be used to represent a document family. Some aspects of these classes correspond to logical structures depicted in FIGS. 3 and 4. Document library 801 is the highest level of organization for documents and schemas. The name of a document library is represented by a string, such as "xCBL." A library optionally may be versioned 802. The library version is represented by string. For a versioned or unversioned library, namespaces may be provided 811. Among namespaces, there may be dependencies, as indicated by the relationship loop that points from the namespace class back to the namespace class. Attributes of the namespace include a namespace URI, a name, a classification, a schema language, a namespace status, a validation status, a namespace version and a description. These attributes may be expressed the strings. In addition, flags or flag values may be provided to indicate whether the namespace is active, inactive, depreciated or depleted. Flags or flag values also may be provided indicate whether the namespace is validated or not validated. Associated with the namespace are an external link 803, global elements 821, schema files 824 and external files 827. In this embodiment, the namespace may be externally linked by a URL to a uniform resource name. A description of the external link 803 also may be provided. The namespace may be linked to a set of global elements 821. These global elements express valid root element names of XML documents, which correspond to document types recognized in the namespace. This class of global elements may be redundant to data maintained in other classes. The namespace also may be linked to a set of schema files 824. Two distinct links may be provided, to root schema files and to other schema file containers. The root schema file is the root file that joins or includes the other schema files. Dependencies among namespaces are modeled, allowing all schema files for a namespace and all dependent namespaces to be retrieved, as well as to ensure that schemas are not accidentally removed leaving other namespaces in inconsistent states. Attributes of a schema file may include a filename string and a relative path string. An absolute path may alternatively the provided. A schema file element 824 is represented by an external file 827. The external file object is used to model the physical location of a file and can be referenced by any entity that requires a physical file representation. This external file may, for instance, be a bean jar file linked directly to the namespace.

The namespace is linked to documents and document families, in this embodiment, through the document ID class 812. The document ID 812 may actually have two types of links to a namespace, one of which is the root namespace it belongs to, and the other which is used for extension namespaces. This supports major versions and minor versions. A major version document ID may be a brand new version of a document that does not extend a previous version of a document. A minor version document ID may extend either a major or minor version document ID. A major version doc ID will only have a single namespace relationship, which references the namespace within which the root element is defined. A minor version doc ID references the super parent (major version) doc ID's namespace, along with any other namespaces within which any extensions exist. The document ID 812 may be associated with the document family 804, an external ID 805, document rule 813, a transformation map 823 and an XML document ID 822. Attributes of a document ID may include a name, a URI and a primary alternate URI. A URI is automatically generated for a doc ID using three components: namespace URI, DocID Name, DocId version. This Doc Id URI is used to refer to this Doc ID. If a user desires a custom Doc ID naming scheme, they may enter their own URI, and this is set in the primaryAltId relationship. Users may also have more than one naming scheme, in which case the otherIds relationship models these names. All these names should be unique. Attributes of a document ID may further include a display name, a description and a document version. All of these attributes may be maintained as strings. A specialization of document ID is XML document ID 822, for XML documents. Attributes of the specialization may include an XML element name, a version type, a bean class name and major and minor versions. As characteristic of XML, a relationship loop indicates that XML document IDs may represent nested elements. An external ID 805 may be associated with the document ID 812. The external ID 805 may be a registry key or an alias for a URI. Both a primary, default link and one or more user supplied aliases may link the document ID and external ID.

Document ID rules 813 may be sufficiently generalized to support transforms, validations, and display maps. Transforms 823, sometimes called transformation maps, are a specialization of the document ID rule 813. Logic implementing the transform is linked to a document ID rule 813 through a set of transform components 825. A transform component, in turn, is linked to an external file 827. Attributes of the transformation map 823 may include a cost or transform success score, a transformation URI and a location URI. The transformation URI uniquely identifies a transformation map within a registry. A location URI is an optional identifier that indicates where the transformation should take place. For example, if only one host within a network is capable of performing the transformation, its URI is assigned to the location URI attribute and the transformation/router will send the transformation to this host to be performed. Attributes of the transformation component 825 may include a transformation component URI, a name, description, component type, implementation file, package name and execution order. Transformation components 825 are linked as a set to the document ID rule 813. The execution order attribute confirms the sequence in which transforms are applied, if more than one transform is required. In this embodiment, transform logic may include one or more of an XSLT map, and XST map, a Java component, or a Contivo map. Transform components are linked to set of configuration elements 826. Attributes of the configuration element may include a name and a value. Document ID rules 813 are also linked to a set of map context strings 814. These strings associate the document ID rule 813 and with a particular trading party, either a sending/source or receiving/target party, or with a particular service or action, as described above in the context of FIGS. 6 and 7.

Figure 9:
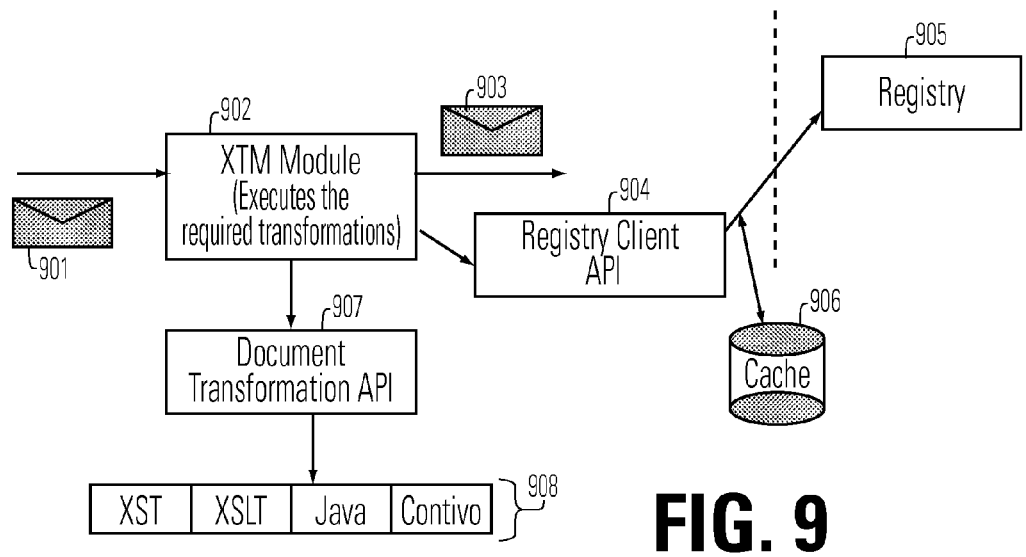
FIG. 9 is a high-level block diagram of a software component that carries out transforms.

Logic to retrieve and execute transforms may conveniently be accessed through an XML transformation module (XTM), as illustrated in FIG. 9. The XTM module is supported by a registry service 905, which serves transformation logic from local and remote registries. A registry client application program interface 904 maintains transparency as to whether a transform is retrieved from a local cache or registry 906 or a remote registry. A retrieved transform or transform reference may be passed to a document transformation application program interface 907, which, in this embodiment, includes resources for various transform types 908. If in alternative embodiment, the registry client API 904 may be invoked from the document transformation API 907, also called a document transformation service. The document transformation service 907 may be invoked by an XTM module 902 either in the services home community or from a remote community, such as a community that is sending documents to the home community. An upgrade to the transformation service may involve adding a new type of transform 908 and new version of the transformation engine 907. Connectors between XTM modules and document transform APIs may be upgraded in phases, after upgrading the document transformation API 907 and the component transforms 908. A document transformation service may be invoked from a different community than the home community. For instance, a service sending a purchase order from community A to community B may invoke the service homed in community B. To perform the transform required so that the PO prepared using community A's semantics will be acceptable to community B, it may be necessary to invoke a transform that only runs on the transformation engine in community B. In this case, the XTM module in community A will invoke the document transform API in community B to remotely execute one or more transforms, converting the purchase order from community A's semantics and to community B's semantics.

Figure 10:
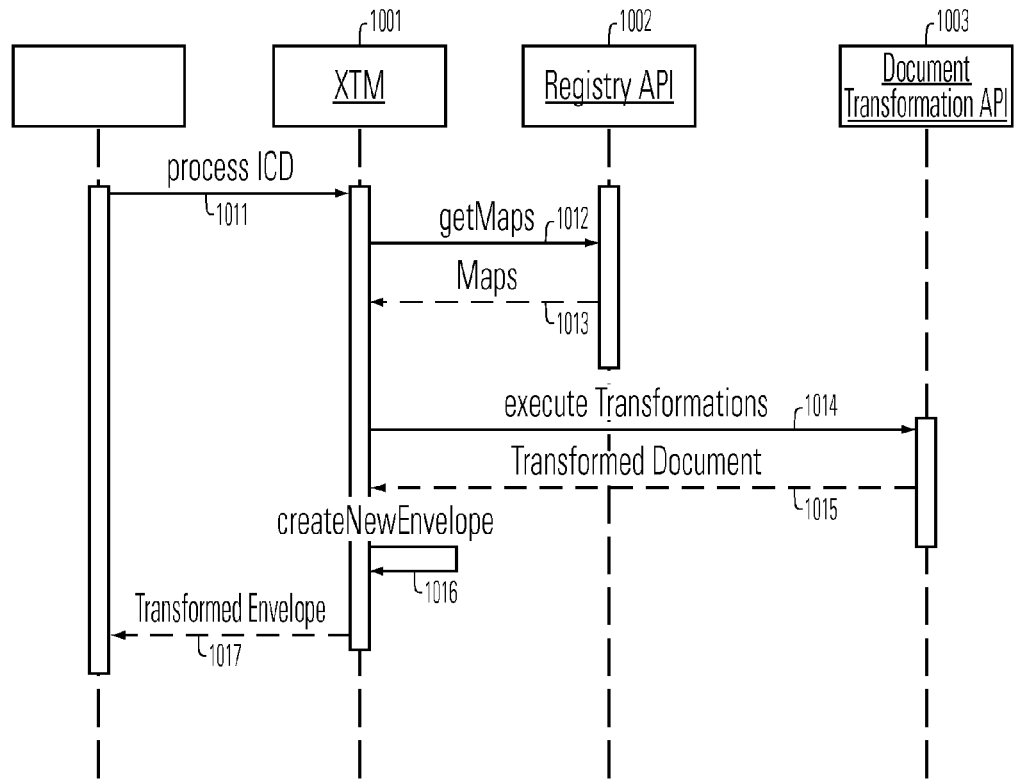
FIG. 10 is a corresponding activity diagram.

The transformation may be identified in the inbound message 901, which may but preferably does not include the details of which transforms should be applied to accomplish the transformation. In FIG. 10, a so-called interoperability contract document (ICD) 1011 is transmitted to the XTM 1001, in the same envelope 901 as the message to be transformed. The ICD may include a path of transformation instructions and connectors along a route to carry a document from source to target. In one embodiment, the XTM module is associated with a connector component in a community of B2B applications, which community may belong to one or more networks of communication. The XTM module may access the ICD and determine whether the transformation instructions that it contains identify its connector as performing any transformation. If there is no transformation to be performed by the current connector or its XTM module, the XTM module may return success and, optionally, may log a pass-through event. If a transformation is to be performed by the current XTM module, it parses the transformation instructions and obtains 1002, 1003 a sequence of transforms be executed from the registry client API 1002. The XTM extracts a source document from the envelope 901. It matches the source document attributes with the first transform to be performed and indicates an error if there is a mismatch. It invokes 1014 the document transform API 1003, with the list of transforms to be retrieved and performed. If an error is generated during the transform process, the error may be noted, or the transform may be aborted and an error message returned. The XTM module 1001 may archive the source and transformed target documents for security, non-repudiation, debugging or other purposes (not illustrated). The XTM module determines whether the target prefers to have the source document transmitted, as well as the transformed target document, and if so, attaches it when it creates 1016 the outgoing envelope 903. The XTM module should be implemented in a thread-safe manner. The transformed envelope 903, is returned 1017.

An ICD is contained in the same envelope 901 as the message to be transformed, may use the following schema to identify a transformation required:

```
<?xml version="1.0" encoding="UTF-8"?>
<xs:schema xmlns:xs="http://www.w3.org/2001/XMLSchema"
elementFormDefault="qualified" attributeFormDefault="unqualified">
    <xs:element name="TransformationContract">
        <xs:annotation>
            <xs:documentation>Transformation Instructions
            </xs:documentation>
        </xs:annotation>
        <xs:complexType>
            <xs:sequence>
                <xs:element name="Attachment" type="xs:boolean"
                    minOccurs="0"/>
                <xs:element name="Transformation" minOccurs="0"
                    maxOccurs="unbounded">
                    <xs:complexType>
                        <xs:sequence>
                            <xs:element name="Connector" type="xs:anyURI"/>
                            <xs:element name="StartDocTypeName"
                                type="xs:QName"/>
                            <xs:element name="StartDocVersion" type="xs:string"/>
                            <xs:element name="EndDocTypeName"
                                type="xs:QName"/>
                            <xs:element name="EndDocVersion" type="xs:string"/>
                            <xs:element name="CommunityID" type="xs:string"
                                minOccurs="0"/>
                            <xs:element name="ComponentID" type="xs:string"
                                maxOccurs="unbounded"/>
                        </xs:sequence>
                    </xs:complexType>
                </xs:element>
            </xs:sequence>
        </xs:complexType>
    </xs:element>
</xs:schema>
```

An example of transformation instructions, according to schema above, is:

```
<xs:element name="Transformation" minOccurs="0"
maxOccurs="unbounded">
    <xs:complexType>
        <xs:sequence>
            <xs:element name="Connector" type="xs:anyURI"/>
            <xs:element name="StartDocTypeName" type="xs:QName"/>
            <xs:element name="StartDocVersionID" type="xs:string"/>
            <xs:element name="EndDocTypeName" type="xs:QName"/>
            <xs:element name="EndDocVersionID" type="xs:string"/>
            <xs:element name="CommunityID" type="xs:string"
                minOccurs="0"/>
            <xs:element name="ComponentID" type="xs:string"
                maxOccurs="unbounded"/>
        </xs:sequence>
    </xs:complexType>
</xs:element>
```

In this example, the source document type is identified by StartDocTypeName and StartDocVersion. The StartDocTypeName should be a fully qualified document type, a QName in XML terms, including a namespace and local name of the root element for the document type. Alternatively, a unique naming convention could be used, with appropriate administrative provisions to enforce uniqueness within a relevant scope. A version identifier should be supplied to distinguish among variations of the same document. A customer may extend an address element within a purchase order, for instance, and the extensions will have a different minor version ID than the major version. EndDocTypeName and EndDocVersion identify the target document resulting from the transform. Community ID specifies the community where the transform is registered. Component ID is used to look up the transform logic, for instance via the transformation component 825.

One implementation of an ICD specifying the target's preference to receive (or not) the original, source document in addition to the transformed target document is expressed in the following schema excerpt:

```
<xs:element name="TransformationContract">
  <xs:annotation>
    <xs:documentation>Transformation Instructions</xs:documentation>
  </xs:annotation>
  <xs:complexType>
    <xs:sequence>
      <xs:element name="Attachment" type="xs:boolean"
        minOccurs="0"/>
```

The attachment tag will indicate whether the original, source document should be attached or not. A default, in the absence of this element, may either be to attach the document or not to attach it.

Figure 11:
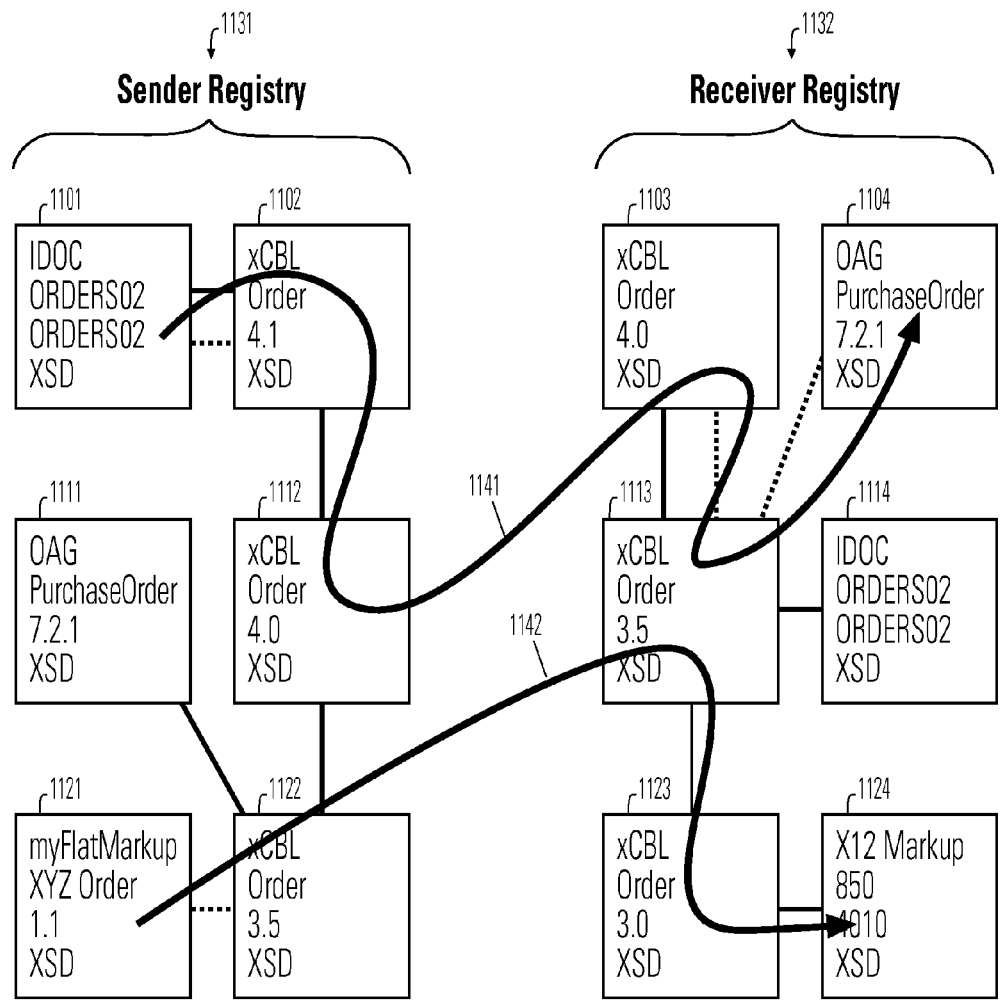
FIG. 11 illustrates sequences of transforms.

FIG. 11 depicts chaining of transforms to convert a document from source semantics to target semantics. In this figure, the document state is indicated by a block and a state-to-state transform is indicated by a solid or dotted line. The solid and dotted lines indicate alternative transforms. These transforms may be public and private transforms or may be generally applicable and specially selected transforms. In the first example, source 1101 desires to send a purchase order to target 1104. The document standard or native interface of the source is IDOC. The document name and version for this purchase order, within IDOC semantics, is ORDERS2. The schema type is XSD. The native interface of the target is OAG. The document name is Purchase Order. The version for this purchase order is 7.2.1. The schema type is XSD. In this example, transforms from both the source or sender registry 1131 and the target or receiver registry 1132 are used. The series of transforms is traced 1141. The source document is subject to source registry 1131 transforms 1101-1102 and 1102-1112. These transforms convert the ORDERS02 document to an xCBL version 4.0 Order document. Two additional transforms 1103-1113 and 1113-1104 from the target registry 1132 are applied next. Thus, by application of four transforms, the IDOC interface document is converted to an OAG interface document. In this instance, the common intermediate semantic base is xCBL. By inspection of FIG. 11, it becomes apparent that three transforms from the sender registry 1131 and a single transform from the receiver registry 1132 could, alternatively, have been used to convert the IDOC interface document. An alternative path would have been to convert from a xCBL version 4.0 to version 3.5 using a transform 1112-1122 in the sender registry 1131. Then, the receiver registry 1132 transform with similar functionality 1103-1113 would not need to be used. The choice of paths 1141 for this conversion may be explained by the dotted line in the receiver registry between 1103 and 1113. This implies that the target preferred use of its own transform for conversion between versions 4.0 and 3.5. In the second example, source 1121 desires to send its XYZ Order to target 1124. Three transforms 1121-1122, 1113-1123, and 1123-1124 are used 1142. Again, the semantic base for transforms is xCBL. A custom transform is used to convert the marked up flat file to xCBL version 3.5. Non-custom transforms are used thereafter to convert the document to X12 markup format. While these examples illustrate transforms stored in both source and target registries, other configurations of registries may equally well be used, such as a single common registry or a common registry and supplemental registries for sources and targets with custom logic components.

Figure 12:
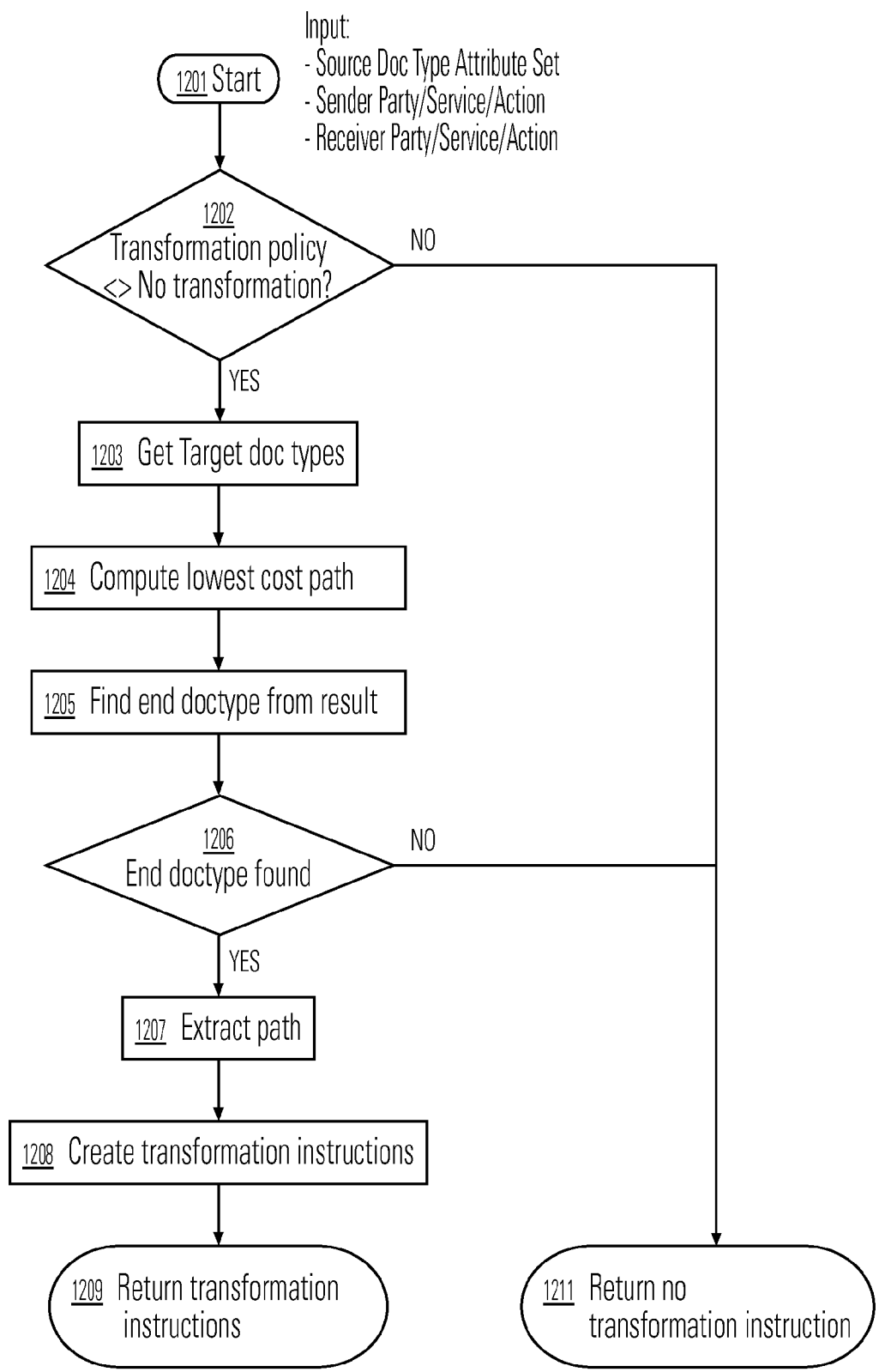
FIGS. 12 and 13 are flowcharts depicting aspects of determining the preferred sequence of transforms to convert a source document into a target document.
Figure 13:
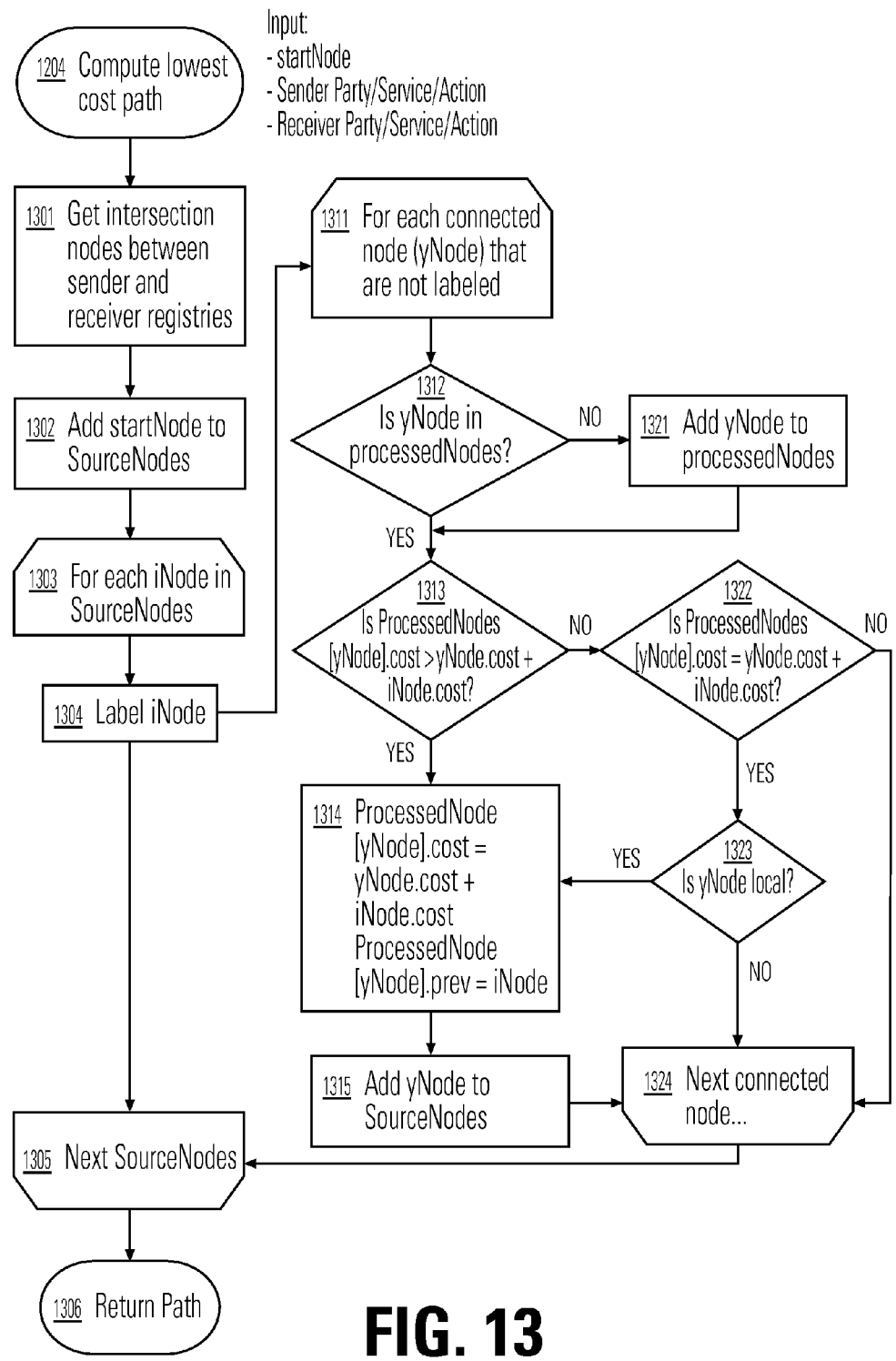

More detail regarding computation of transform sequences using both source and target registries of transforms is provided in flowchart FIGS. 12 and 13. FIG. 12 is an overall flowchart. FIG. 13 depicts one of many algorithms that can be used to trace paths through one or more registries of document family members. FIG. 12 begins 1201 with information about the source document and identifications of the source and target. The source document is described by a document type attribute set. The source and target are described by a triplet of party, service and action. The first logical branch 1202 determines whether a policy against transformations has been set. This type of policy might apply where the target wants the source to bear all risk of an erroneous transformation, so use of public transform elements is at the source's own risk. If there is a policy against transformation, a no transform instruction message is returned 1211. Passing the logical branch 1202, the document type of the target is retrieved 1203. This may be from a registry, as described above. Give information about the source and target documents, alternative transform sequences or paths are determined 1204, which may include transform success scores for the paths and also may include transform preferences of the source and target. The list of alternative paths is inspected and candidate paths that produce the desired target document type are identified 1205. If no path producing the desired target document type appears in the list, a no transform instruction message is returned 1211. Passing the logical branch 1206, a preferred path is selected and extracted 1207. The preferred path may have a preferred transform success score or it may conform to transform preferences of the source, target or both. Transform instructions are created 1208 and returned 1209.

FIG. 13 illustrates tracing transform sequence paths through source and target registries, beginning from a particular document family member. In overview, the algorithm queries the source and target registries for the intersection of identical document types in the source and target document families. It performs integrity and error checks not illustrated in the figure. For each part of a multi-part message, it determines the target document and runs a cost algorithm that recursively traverses a document family graph, following transform links between document state nodes. If the document type of a node is among the intersection of identical document types previously determined, the algorithm splits into a path through both registries. If a transformation policy applies that requires lossless transformation (perfect transform success scores), then lossey transform paths are ignored. This traversing and costing are a variation on Dijkstra's algorithm for solving a single-source, shortest-path problem on an edge-weighted graph in which all the weights are non-negative. It finds the shortest paths from some starting node to all other nodes, one-by-one. Paths are traversed, in Dijkstra's algorithm, in order of their weighted lengths, starting with the shortest, proceeding to the longest. In general, any traversal of the applicable document families from source document to target document may be used, and document families may be small enough that the particular traversal used has minimal impact on computational costs.

Referring to the flow chart in FIG. 13, this part of the algorithm begins 1204 with a start node or document family member, and party/service/action triplets identifying the source and target. At step 1301, an intersection of nodes between source and target registries is calculated. For instance, do both source and target process xCBL version 3.0 or xCBL version 3.5 documents? If there is no intersection between document semantics processed by the source and target, no transform sequence is available. Referring to FIG. 11, the intersection would be xCBL versions 4.0 and 3.5 (1112 to 1103 and 1122 to 1113). Lists are maintained by this processing algorithm of SourceNodes, ProcessedNodes and transform sequences. Some or all of these lists may be maintained in stacks or heaps of recursively allocated and processed variables. Referring to FIG. 5, boxes (e.g., 501, 502 or 503) are SourceNodes from which a walk of the directed graph proceeds. SourceNodes may be labeled or unlabeled, depending on the progress of the walk. The walk begins by adding the StartNode to the list of SourceNodes 1302. The list is processed in a loop bounded by 1303 and 1305 and by an inner loop bounded by 1311 and 1324. At 1303, processing of a so-called iNode in the SourceNodes list begins. The current iNode is labeled. Then, connected members of the document family that have not yet been labeled are considered 1311. For instance, referring to FIG. 5, for iNode 501B, the connected document family member nodes would be 501A, 501C, 501F and 502C. The connected nodes that are unlabeled are called yNodes 1311. A yNode is tested 1312 to determine whether it is in the ProcessedNodes list and, if not, it is added to the list 1321 and processed 1313. If the yNode is in the ProcessedNodes list, the algorithm determines whether the current path to the yNode is better than previously calculated paths. At step 1313, the cost of reaching the current yNode is compared to the previous cost of reaching the same node. If the current cost is better than the old cost, processing proceeds to step 1314, where the ProcessedNode list is updated. At step 1315, yNode is added to the SourceNodes list for later processing. Again at step 1313, if the current cost is not better, then processing proceeds to step 1322, which tests whether the costs are the same. If the costs are the same, then a variety of criteria might be used to break the tie 1323. One criterion is to favor an instance of yNode that is in the receiver's registry, when the same node appears in both the receiver's and sender's registries. Another criterion would be to favor an instance of yNode that is in the sender's registry. Yet another criterion would be to favor the path that involves the fewest nodes or hops. At step 1324, processing loops to 1311, where the next connected node that is not labeled is processed. If the unlabeled connected nodes all have been processed, the next step is 1305, at which processing loops to 1303 where the next iNode in SourceNodes is processed. When all SourceNodes have been processed 1305, the results of this processing are returned 1306.

The calculation of alternative transform sequences and preferred transform sequences may operate in different environments. The following use cases illustrate some of these environments. In the first use case, no transformation is required. The module for determining a transform sequence is invoked, but the source and target documents are the same type. No transformation is required. In the second use case, no transformation is available between source and target. This may be the case when no transform sequence can be calculated between differing source and target documents, or when transformation policy is "no transforms" and the source and target documents differ, or when only a lossless transformation is accepted but all calculated transform sequences are lossey, as indicated by their transform success scores. An operating exception occurs. In the third use case, the source and target are in the same community, so only one transform registry is queried and a valid path exists. One or more transform sequences are determined. A preferred sequence is determined. In a fourth use case, the source and target are in separate communities and a valid path exists. Two transform registries are queried. As in the third case, one or more transform sequences are determined and a preferred sequence is determined.

Transform success scores, as described above, can be determined a priori, by experience or dynamically, or, more generally, by any metric of a lossey semantic transform. An a priori score is assigned to a transform based on some combination of analysis and tests. The score does not change with experience. An experience based score may begin with an a priori score or a default score, and be adjusted with experience. For instance, methods of dynamically computing success, explained below, can be applied for selected transforms that are used, and the corresponding transform success score updated, for instance as a weighted or moving average, either discarding an oldest historical success score or assigning relative weights to past and present success scores. One approach to dynamically determining success scores is to apply a transform to the candidate document and analyze the transformed document. The transform is applied to the source or intermediate source document, producing a target or intermediate target document. The content of elements (in an XML or similar document) is listed for source and target documents, for instance in a frequency table. Discrepancies between the source and target frequencies reduce the transform success score, regardless of whether the difference is positive or negative. The discrepancies optionally are reported. The success score can depend on exact matches between element contents, or may be weighted by degree. The following example helps illustrate this approach to dynamic scoring. The source document fragment is:

```
<NameAddress>
    <Name>Pikachu Pokemon</Name>
    <Address1>125 Henderson Drive</Address1>
    <City>Pleasanton</City>
    <State>CA</State>
</ NameAddress >
```

The transformed target document fragment is:

```
<NameAddress>
    <Name>Pikachu Pokemon</Name>
    <Street>Henderson Drive</Street>
    <HouseNumber>125</HouseNumber >
    <City>Pleasanton</City>
    <State>CA</State>
</NameAddress>
```

A frequency comparison, based on elements of the source document fragment and keyed to exact matches would be:

| Content | Source Doc frequencies | Target Doc frequencies |
| --- | --- | --- |
| Pikachu Pokemon | 1 | 1 |
| 125 Henderson Drive | 1 | 0 |
| Pleasanton | 1 | 1 |
| CA | 1 | 1 |

A dynamic transform success score corresponding to the fraction of fields in the source document that appear verbatim as fields in the target document can be expressed as a success of 75 percent or a cost of 25 percent could be assigned to this example. A different score would be assigned if partial matches counted, as the house number element of the target document matches one token of the address 1 element of the source document. The success score could correspond to the fraction of the text in fields of the source document that appears verbatim in fields of the target document. Application of a sequence of scores requires calculation, for some purposes, of an aggregate success scores. When individual scores are combined into an aggregate transform success score, the combination may be additive, averaged or multiplicative. The method of constructing an aggregate transform success may take into account the number of transforms in sequence, as in the multiplicative combination of success scores or may accumulate (without compounding) the errors, as in the additive combination of costs. For instance, in the multiplicative combination, if the transforms are T1, T2 and T3, loss percentages can be calculated for each of the three and combined as (1−T1)*(1−T2)*(1−T3). More generally, an aggregate transform success score may be any metric of a sequence of transforms resulting in a lossey transformation from source to target document.

Figure 14:
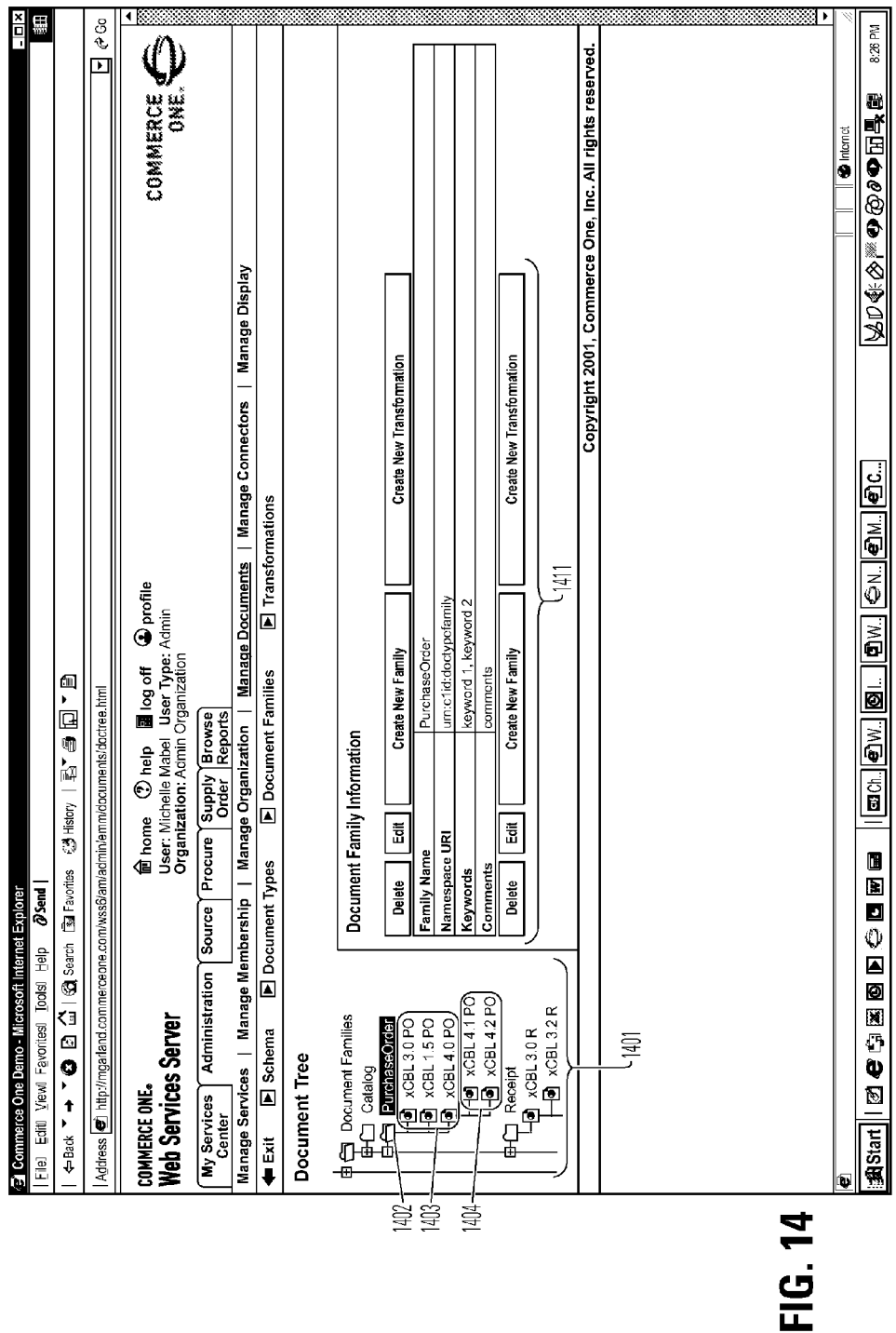
Figure 15:
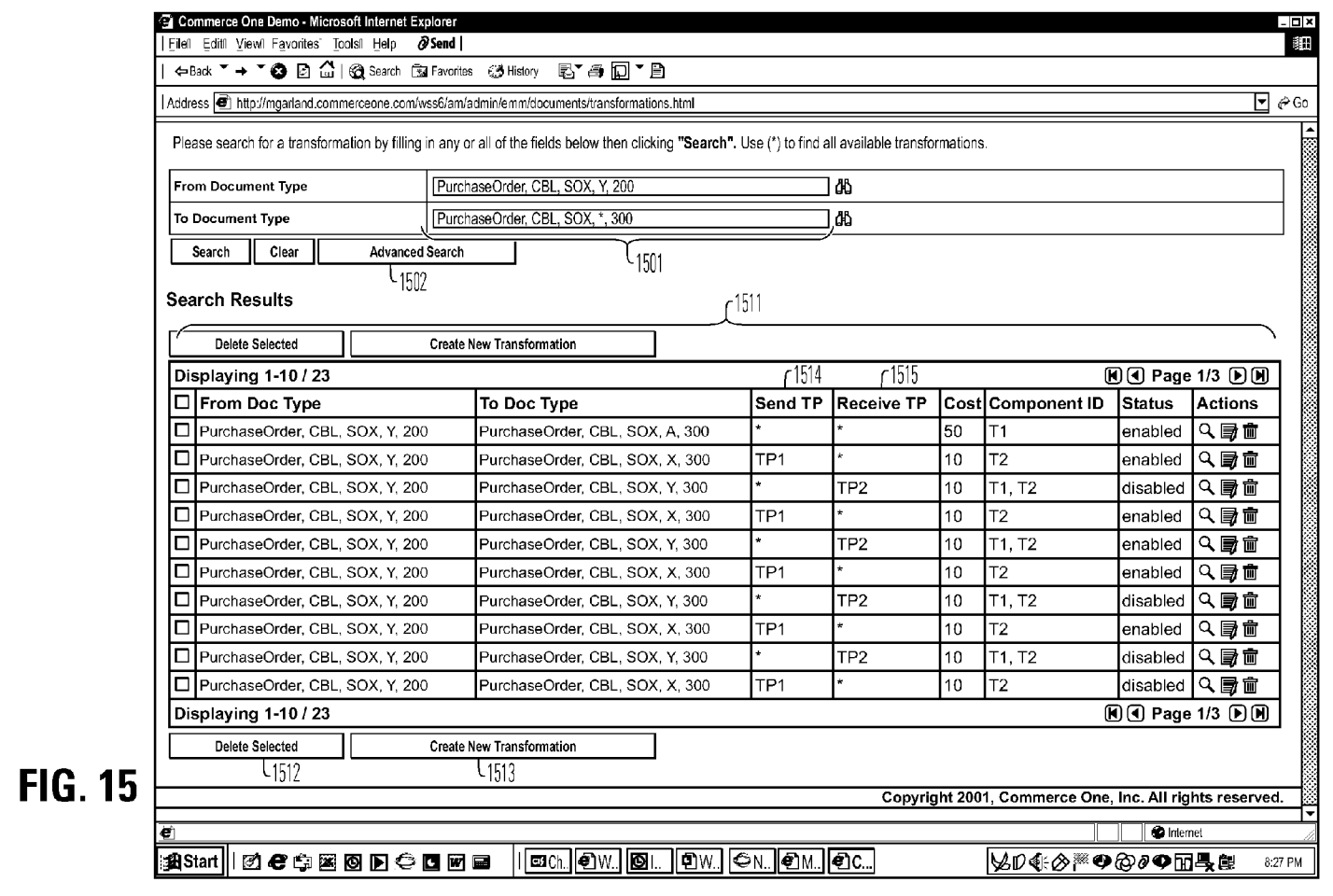

User interfaces for administering document family information and for searching for transforms are illustrated in FIGS. 14 and 15. FIG. 14 depicts a user interface supporting administration of document families. A document tree 1401 shows the hierarchical interrelationship of major 1403 and minor 1404 versions of a document 1402. For a family, document family information common to family members is displayed 1411. FIG. 15 depicts a user interface supporting a search to find available transforms, for instance, to prepare a new transform sequence. The results displayed 1511 identify part of 23 transform sequences that convert a source document (PurchaseOrder, CBL, SOX, Y, 200) from xCBL version 2.0 to version 3.0. The search criteria are specified using a standard 1501 or advanced 1502 query interface. One or more rows of the results can be deleted 1512 or used to create a new transformation 1513. In this example, the transform sequences returned vary by expressed preferences of sending party 1514 or receiving party 1515, cost or losseyness of the transform 1516 and logical components implementing the transform sequence 1517.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted processing, systems including logic to carry out transform processing, media impressed with logic to carry out transform processing, data streams impressed with logic to carry out transform processing, or computer-accessible transform processing services. It is contemplated that modifications and combinations will readily occur to those skilled in the art, which modifications and combinations will be within the spirit of the invention and the scope of the following claims.

We claim as follows:

1. A computer-assisted method of transforming a document with semantic encoding destined for a target service, including:
   electronically requesting by target service identifier and receiving from an interface registry at least one target document version used by a target service from among a plurality of document versions in a document family; and
   electronically requesting by source and target document versions and receiving from a document family registry one or more transforms or references to transforms to be applied sequentially to convert a document from the source document version to the target document version.

2. The method of claim 1, further including applying the transforms to convert the document from the source document version to the target document version.

3. The method of claim 2, wherein the target service identifier is a party/service/action triplet.

4. The method of claim 2, wherein the source and target document versions use different semantic encoding of data, which requires transformation.

5. The method of claim 4, wherein versions of the semantic coding include major versions distinguished by system standard and minor versions distinguished by release version within a particular system standard.

6. The method of claim 1, wherein the document family registry includes for document family members identifications of a system standard, a document identifier, a release version and a schema type.

7. The method of claim 1, wherein the transforms include one or more of Contivo maps, XSLT maps, XST maps, XSD-SOX classes, and Java maps.

8. The method of claim 1, wherein applying the transforms includes using processing resources of a requesting service, distinct from processing resources of the document family registry.

9. The method of claim 1, wherein the transforms are stored in the local repository and are checked against a non-local repository for currency before application.

10. The method of claim 1, wherein applying the transforms includes preserving semantically coded source data from the document in a user viewable field of a transformed document.

11. The method of claim 1, further including selecting among alternative sequences of transforms based on a transform success score.

12. A computer-assisted method of exposing transforms applicable to a document family, including:
   maintaining a document family registry data structure, including for a particular document family
   document family versions;
   transforms including program instructions that transform data between document family versions;
   responding to requests that identify first and second document family versions by providing one or more sequences of transforms or references to transforms to be executed remotely, that transform the data from the first document family version to the second document family version.

13. The computer-assisted method of claim 12, wherein the document family versions in the document family registry data structure are identified by library, document identifier, release version and schema type.

14. The method of claim 12, further including traversing the document family registry data structure and identifying one or more sequences of multiple transforms that collectively transform from the first document family version into the second document family version.

15. The method of claim 14, wherein:
maintaining the transforms further includes maintaining transform success scores; and
responding to requests further includes calculating composite transform success scores for the sequences of transforms.

16. The method of claim 15, wherein the transform success scores correspond to a fraction of fields translated verbatim from a field of the source document to a field of the target document.

17. The method of claim 15, wherein the transform success scores correspond to a fraction of text in fields of the source document found verbatim in fields of the target document.

18. The method of claim 12, wherein:
maintaining the document family registry data structure further includes maintaining special rules for transforms to be applied corresponding to one or more participants in a document exchange.

19. The method of claim 12, wherein:
the transforms to be executed remotely are privately maintained transforms, maintained separately from the document family registry data structure.

20. The method of claim 12, wherein:
maintaining the document family registry data structure further includes maintaining special rules for transforms to be applied corresponding to one or more participants in a document exchange; and
responding further includes referring to private transforms, maintained securely within the document family registry data structure.

* * * * *